July 29, 1930. E. H. SHOLAR Re. 17,750

FIREPLACE BASKET

Original Filed May 19, 1927

Edward H. Sholar Inventor

By C. A. Snow & Co.

Attorneys

Reissued July 29, 1930 Re. 17,750

UNITED STATES PATENT OFFICE

EDWARD H. SHOLAR, OF CHATTANOOGA, TENNESSEE

FIREPLACE BASKET

Original No. 1,650,303, dated November 22, 1927, Serial No. 192,647, filed May 19, 1927. Application for reissue filed March 1, 1929. Serial No. 343,814.

This invention relates to a fireplace basket of that type designed for use in fireplace frames.

Heretofore different manufacturers have produced frames for fireplaces having differently arranged supported lugs for holding baskets in position. Consequently only fireplace baskets of a certain construction can be used with each form of fireplace frame. Some of these frames have supporting lugs arranged in pairs but in many instances the lugs are spaced apart different distances. Furthermore the lugs are of different sizes on different makes of frames and also of different shapes and lengths. Thus when it is found necessary to install a new basket care must be exercised to procure a basket made to fit the particular kind of a frame set up at the fireplace.

It is an object of the present invention to provide a basket which is so constructed that the same can be used with practically all kinds of supports, thus adapting the basket for general use so that it can be handled in quantities and sold to customers having different makes of fireplace frames.

Another objection heretofore present where removable fireplace baskets have been used has been the difficulty in installing some kinds of baskets because of the small clearance provided thereabove. Some fireplace frames have their tops close to the tops of the fireplace baskets while others are at greater distances therefrom. Therefore those baskets which must be inserted downwardly into position with the supporting means cannot sometimes be employed in connection with frames having low lying tops.

An object of this invention is to provide a fireplace basket which can be used with fireplace frames of different heights, it being possible to insert the basket into engagement with its supporting means either by moving it upwardly to position or downwardly to position as may be found most convenient.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings.

Referring to the figures by characters of reference A designates a fireplace frame which, in the present instance, is provided at each side with a pair of supporting lugs B and C at each side thereof. The lugs of each pair are disposed in superposed relation. In the present instance these lugs are shown rectangular in cross section but it is to be understood that they can be of other cross sectional contours and can be of different lengths without interfering with the proper mounting of the present invention thereon. Furthermore these lugs can be of any desired distances apart.

Figure 3:
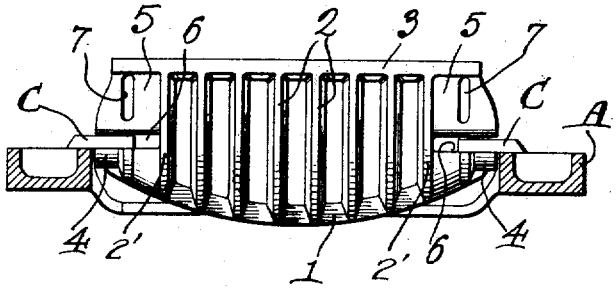
Figure 3 is a section on line 3—3, Figure 1.

The basket constituting the present invention includes horizontally extending front bars 1 constituting the front of the basket and backwardly extending bars 2 constituting the bottom of the basket, these latter bars being upcurved at their front ends where they join the lower bar 1. The rear ends of the bars 2 are connected by an integral bar 3 while the rear ends of the bars 1 are connected by integral vertical bars or upstanding portions 4. The bottom of the basket is provided, at its ends or, rather, at the sides of the basket, with webs 5 and each web has a slot 6 extending thereinto from its free edge inward to the bar 2′ forming one side of the web. If desired one or more slots 7 can be provided in the webs to allow air to circulate therethrough and thus keep the webs cool. Each web, with its bar 2′ is connected to the lower extremity of the upstanding portion 4 as shown in Figure 3.

The front walls of the slots 6 are flush with the rear edges of the bars 4 and extending from the upper ends of the bars 4 are hooks 8 the bills of which are extended downwardly and preferably beveled as shown at 9. Located at the outer edge of each of the webs 5 is a hook or tongue 10 curved forwardly and upwardly and constituting the back wall of the adjacent slot 6. Each tongue with its base consisting of web 5 and bar 2′ connected to the lower extremity of the upstanding front portion of the basket, may be considered as forming a hook for the purpose hereinafter explained. The upper ends of the tongues 10 are arranged below the bills 9 of the hooks 8 but are spaced therefrom sufficient distances to permit the insertion of the largest lugs B or C that might be used for supporting a basket. It is also to be understood that the bills 9 of the hooks are spaced sufficient distances from the bars 4 to allow for the reception of the largest forms of lugs B or C that are in use. Tongues 10 are also spaced apart at their upper ends from the bars 4 a distance equal to that provided between the bills and the bars 4. The upper portions of the tongues 10 are parallel with the bars 4 but the spaces between the tongues and bars gradually flare downwardly as will be clearly apparent by referring to Figures 2 and 4. Furthermore the side bars 4 are cut away at their lower ends at points above the plane of the top faces of the bars 2, these lower ends being rounded as indicated at 11.

Figure 2:
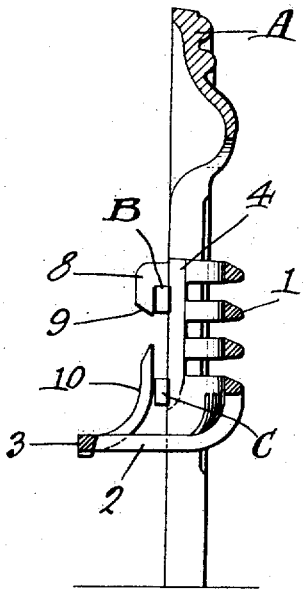
Figure 2 is a section on line 2—2, Figure 1.
Figure 1:
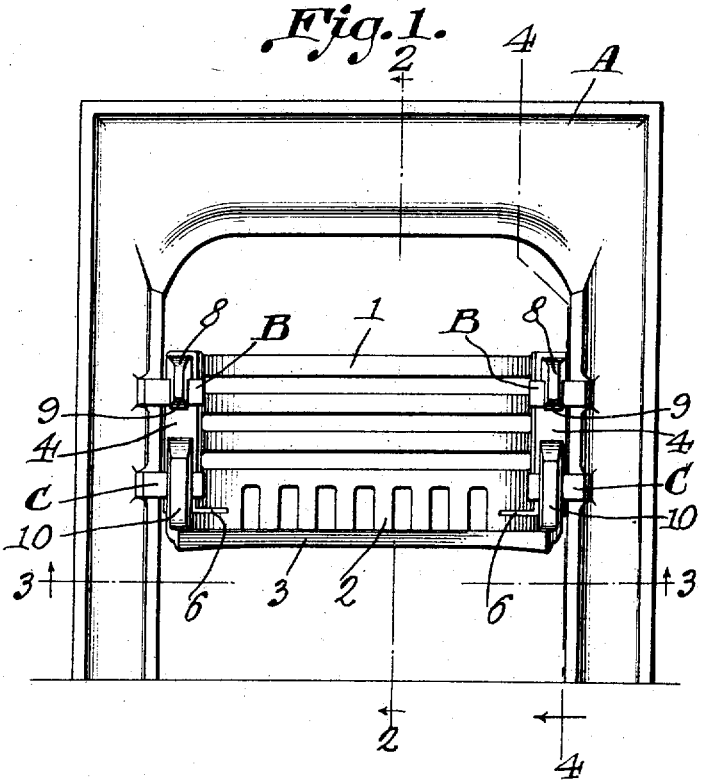
Figure 1 is a rear elevation of a fireplace frame showing a basket supported therein, said basket being of the construction constituting the present invention.
Figure 4:
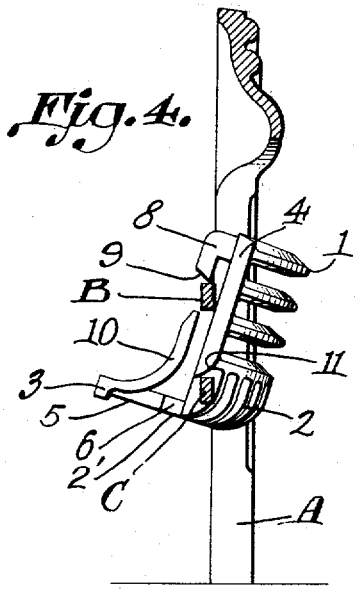
Figure 4 is a view showing one of the positions of the fireplace basket while being inserted into engagement with the supporting lugs, said section being taken on line 4—4, Figure 1.

In assembling the basket with a fireplace frame A the same can be inclined as shown in Figure 4 and inserted into the frame so that the lugs B will enter between the bills 9 and the tongues 10 and the bars 4 will be disposed above the lugs C. The lower portion of the basket is then swung forwardly while the upper portion is swung rearwardly. Consequently the bills 9 will be brought to position where they can be moved downwardly back of the lugs B. At the same time the bars 4 will be brought to position in front of the lugs B. Thereafter the basket can be lowered and these lugs C will be received between the bars 4 and the tongues 10 while the lugs B will be received by the hooks 8. This arrangement of the parts has been illustrated in Figure 2. Obviously with this arrangement a low frame A will not interfere with the proper insertion of the basket. Of course where the frame is sufficiently high to permit it, the entire basket may be placed above the lugs B and then lowered straight down onto the two lugs B and C. This is the method usually followed in assembling the baskets with frames. However where the frames are low as shown in Figures 1 and 2, this method of assembly cannot be followed.

As the spaces between the bars 4 and the bills 9 and tongues 10 are open at both sides, it will be apparent that lugs B and C of any lengths can be received thereby provided they are not longer than the slots 6 and the webs 5. It will also be apparent that the distance between the lugs B and C will have no effect upon the proper supporting of the basket.

What is claimed is:

1. A fireplace basket having an upstanding front portion and a substantially horizontal bottom portion, hooks at the sides of the upstanding front portion extending rearwardly and downwardly adjacent the top of the basket, and an upwardly and forwardly curved tongue below and spaced from each hook and integral with the bottom of the basket.

2. A fireplace basket having an upstanding front portion with side bars and a substantially horizontal bottom portion, rearwardly and downwardly extending hooks at the upper ends of the bars, upwardly and forwardly curved tongues integral with the sides of the bottom of the basket and having their upper ends alining with and spaced from the lower ends of the hooks, there being spaces between the side bars and the hooks and tongues, said spaces being open at both sides and at the bottom thereof.

3. A fireplace basket having an upstanding front portion with side bars and a substantially horizontal bottom portion, rearwardly and downwardly extending hooks at the upper ends of the bars, upwardly and forwardly curved tongues integral with the sides of the bottom of the basket and having their upper ends alining with and spaced from the lower ends of the hooks, there being spaces between the side bars and the hooks and tongues, said spaces being open at both sides and at the bottom thereof, the lower ends of the side bars terminating above the lower ends of the tongues.

4. A fireplace basket having an upstanding transversely disposed front portion and a substantially horizontal bottom portion including bottom bars, side bars connecting the ends of the front bars, webs constituting the sides of the bottom of the basket having alining slots extending thereinto from their outer edges, backwardly and downwardly extended hooks at the upper ends of the side bars and overhanging the slots, upwardly and forwardly curved tongues integral with the bottom of the basket, the upper ends of the tongues being in line with but spaced from the lower ends of the hooks, there being spaces between the side bars, the hooks and tongues, said spaces being open at both sides and at the bottoms thereof.

5. A fireplace basket having hook members at the opposite extremities thereof, said hook members at each extremity being arranged in pairs and vertically spaced, the bills of each pair of hook members being disposed one toward the other.

In testimony that I claim the foregoing as my own, I have hereto affixed my signature.

EDWARD H. SHOLAR.